Jan. 30, 1951

M. KATZ 2,539,842

SHOCK ABSORBER

Filed July 12, 1945

Inventor

Maurice Katz

By Cameron, Kerkam + Sutton
Attorney

Patented Jan. 30, 1951

2,539,842

UNITED STATES PATENT OFFICE 2,539,842

SHOCK ABSORBER

Maurice Katz, Toulouse, France

Application July 12, 1945, Serial No. 604,710
In France October 24, 1944

11 Claims. (Cl. 267—64)

The present invention relates to improvements in and relating to shock absorbers as described in an earlier patent application filed on June 25, 1945, Serial No. 601,483.

The improved shock absorber structure of the present invention is particularly well adaptable to use in the landing gear of aircraft and comprises certain characteristic features which will appear from the following detailed description of the embodiment disclosed.

One form of a shock absorber according to the present invention is shown by way of non-limitative example in the appended drawing, in which.

Figure 1:
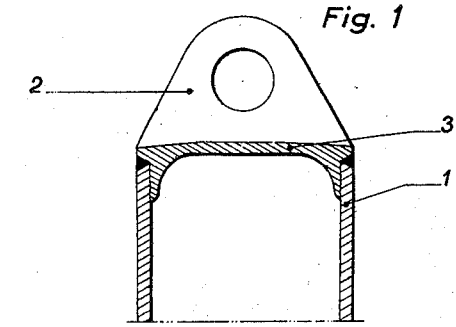
Figure 1 is a vertical sectional view, broken at two points, showing the shock absorber in the position of compression after an impact.

The shock absorber essentially comprises a fixed part 1 fastened on the fuselage at 2, having the form of a pneumatic cylinder closed by a cap 3 and provided with a nipple, not shown in the drawing, for filling with oil and air, and a movable part 6 connected with the wheel at 7 and formed of a cylinder filled with liquid and closed by a bottom 8. A stuffing box 10 is interposed between the fixed and movable cylindrical parts 1 and 6 in order to insure air and liquid tightness.

An inner fitting 11 is fast with the lower end 12 of the element 1, said fitting being provided with holes in which are located balls 13 the duty of which will be explained later on, as well as with a peripheral enlargement in the form of a diaphragm-piston 15 having a cylindrical piston portion 16 which slides on the inner surface of the element 6. The diaphragm portion of element 15 is provided with a circumferentially arranged series of vertically extending holes 17. The fitting 11 terminates at its lower end in a radially inwardly extending annular part 18; large openings or ports 19 being provided in the lower cylindrical portion of the fitting between the diaphragm 15 and the annular part 18.

A port controlling sleeve 20 is slidably mounted inside the cylindrical portion of the fitting 11, said sleeve comprising a collar 21 at its upper end resting on a compression spring 22 which itself rests on the upper edge of the fitting 11, and, in its outer surface at a point intermediate its ends, a groove 23 which the balls 13 enter when the sleeve is in its lowermost position wherein it closes the openings 19. The sleeve 20 is also provided with a plurality of radially inwardly extending spurs 24 at the lower end thereof.

A rod 25 fast with the bottom 8 of the movable part 6 passes thru the annular part 18 of the inner fitting 11. At its upper end said rod is provided with a head 26 acting thru the medium of a compression spring 27 upon a bush 28 having an edge or collar 29, spring 22 being weaker than the spring 27. Splines 30 with a suitable profile are provided along the rod 25.

The splines 30 form with the openings 35 in the lower end 12 of fixed part 1 a passage for the flow of oil which is of such cross section that the total reaction of the shock absorber follows a law which is a function of the stroke, allowance being made for variations of the displacement speed of the movable part.

An annular disc 31 surrounds the cylindrical portion of fitting 11 just above the holes 17 of the diaphragm-piston 15 and is freely movable in a vertical direction in order to form a valve.

Lastly, a profiled locking ring 32 is mounted with a tight fit inside the cylinder 6 above the diaphragm-piston 15 and the disc 31, the latter being free to move vertically between the upper surface of the diaphragm-piston and the lower edge of the inclined inner flange of the locking ring. The horizontal portion of profiled ring 32 is provided with a plurality of circumferentially arranged openings 33 which provide relatively free passage for the flow of oil into and out of an annular chamber 34 formed between parts 1 and 6, their stuffing-box 10 and ring 32. Openings 35 having a small section are provided in the lower part of element 1 in order to put the chamber 34 in communication with the chamber inside of element 1 thru restricted passages.

Figure 3:
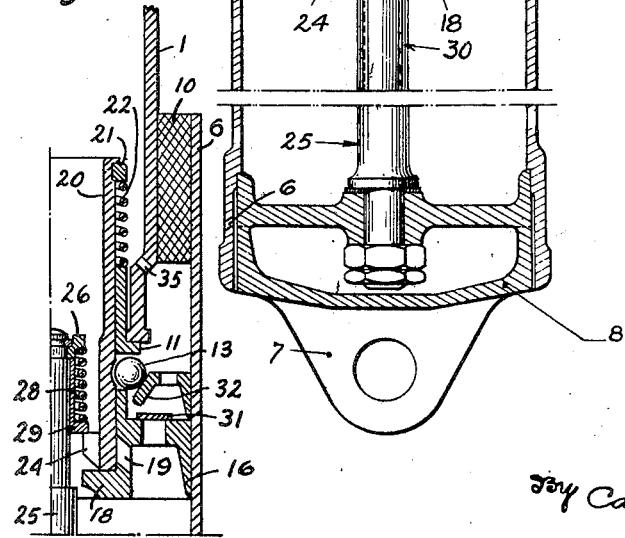
Figure 3 is a view similar to Figure 2 showing the parts in fully expanded position.

The device works in the following manner:

Before landing, when the shock absorber is completely expanded, the port controlling sleeve 20 occupies the position shown in Figure 3 in which it is maintained in its lower position by engagement of the collar 29 of bush 28 with spurs 24 and closes the openings 19, but is not locked by the balls 13. When the aircraft comes into contact with the ground, on landing, the element 6, which is fast with the wheel, slides telescopically with respect to element 1 and carries along thru friction, in its upward movement, the profiled ring 32 which in turn forces the balls 13 into the groove 23, thus locking the sleeve 20 in port closing position, said sleeve being held stationary during the small part of the stroke necessary for said operation, i. e., while the balls 13 are being forced into the groove 23, thru the action of spring 27 which expands before the weaker spring 22.

The liquid contained in the chamber formed by the cylinder 6 passes thru the holes 17, raises the annular valve disc 31 and passes through the openings 33 into the chamber 34 from which it flows in a small quantity thru the openings 35 into cylinder 1.

The principal throttling action which produces the reaction necessary for the shock absorber is effected thru the annular space provided between the rod 25 and the annular part 18 of the diaphragm-piston 15 as well as thru the splines 30 provided along the rod, and continues during the whole duration of the shock of the landing.

Figure 2:
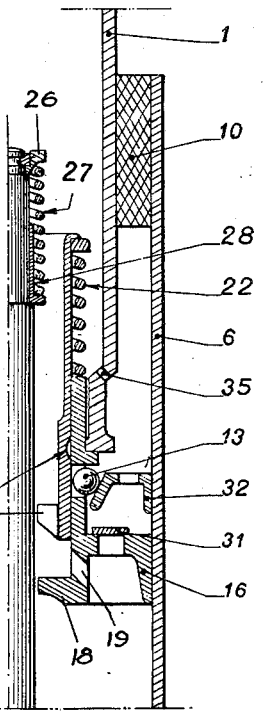
Figure 2 is a partial vertical sectional view showing certain parts of the shock absorber of Figure 1 in the positions occupied thereby after the shock absorber has expanded a predetermined amount following the braking of a compressing impact.

When the landing shock has been damped an expansion begins and tends to push the element 6 away from element 1. The annular valve disc 31 rests against the piston 15 while closing the holes 17 so that the oil confined in the chamber 34 can escape now only thru the openings 35; said oil, therefore, brakes the expansion. While moving away the element 6 carries with it the profiled ring 32 thru friction so that, after a predetermined amount of the outward or extending movement of the element 6, the balls 13 are released and move out of the groove 23 and the sleeve 20, which is no longer locked, raises under the action of its return spring 22, as shown in Figure 2, and uncovers the openings 19. The latter establish a relatively free communication between the inside of element 6 and the inside of element 1; the liquid mass, thus finding a free passage, produces substantially no more reaction.

Since the hydraulic element no longer intervenes, the reaction is chiefly insured by the elastic element independent of the speed. Thus, the suspension is very flexible.

When the aircraft takes off, the shock absorber continues to expand progressively. At the end of the movement, the stop or collar 29 pulls on the spurs 24 in the bottom of the sleeve 20 which is thus returned to the position for closing the openings 19, as shown in Figure 3.

Instead of being carried along thru friction the profiled ring 32 which serves for locking the balls 13 could also act thru inertia or under the action of the pressure of the liquid, the effects of which are exerted in the same direction, or under the action of all these forces combined with one another.

Moreover, various other modifications may be made in the device which has been described and shown by way of non-limitative example without departing from the scope and spirit of the invention. Thus, the sleeve 20 could be pushed into the port opening position shown in Figure 2 by any action other than that of the spring 22, for example by gravity.

I claim:

1. A shock absorber particularly adaptable to use in the landing gear of aircraft comprising telescoping members and diaphragm means dividing the space enclosed by said members into communicating chambers one of which is of variable volume and filled with liquid and another which contains liquid and elastic cushioning means exerting a force on said liquid and tending to extend said members, said diaphragm means having a substantially unrestricted liquid passage therethrough and also a restricted liquid passage therethrough, a valve member movable to a position restricting the flow through said first passage, means on one of said telescoping members engageable with means on said valve member to move said valve member to flow restricting position when said telescoping members are fully extended, retaining means comprising a member movable by one of said telescoping members into engagement with said valve member in its flow restricting position, on initial compression movement of said telescoping member from fully extended position for holding said valve member in said flow restricting position and out of engagement with said valve member on extending movement of said telescoping member, and means on one of said telescoping members for moving said valve member to non-restricting position when released by said retaining means, said first passage being thereby restricted throughout initial compression of said telescoping members and until after an extension of predetermined amount.

2. A shock absorber according to claim 1, said telescoping members forming a third chamber of variable volume that is full of liquid, orifice means connecting said third chamber with said second mentioned chamber, and valve means controlling communication between said third chamber and said first mentioned chamber, said valve means closing on extending movement of said telescoping members.

3. A shock absorber according to claim 1, said retaining means comprising a member movable inwardly into interlocking engagement with a cooperating portion of said valve member, said interlocking parts being in registry when said valve member is in flow restricting position but out of registry when said valve member is in non-restricting position.

4. A shock absorber particularly adaptable to use in the landing gear of aircraft comprising telescoping members, diaphragm means in one of said members, said diaphragm means having an opening therethrough providing a restricted liquid communication between the chambers on opposite sides of said diaphragm means, one of said chambers being of variable volume and filled with liquid and the other containing liquid and elastic cushioning means exerting a force on said liquid and tending to extend said members, said diaphragm means also having a substantially unrestricted liquid passage therethrough, a normally open valve member for said passage, means on one of said telescoping members engageable with means on said valve member to move said valve member to closed position when said telescoping members are fully extended, interlocking means for retaining said valve member in closed position including a retaining member movable into engagement with a cooperating portion of said valve member, means engageable with said retaining member and one of said telescoping members for moving said retaining member toward said valve member on compression movement of said telescoping member and for releasing said retaining member on extension movement of said telescoping member, said retaining member and cooperating portion being is registry when said valve member is in closed position whereby said valve member is retained in closed position during compression of said telescoping members from fully extended position and until after an extension of predetermined amount, and means on one of said telescoping members for moving said valve member to its normally open position when said retaining member is released, thereby moving said cooperating portion out of registry with said retaining member.

5. A shock absorber according to claim 4, said telescoping members forming a third chamber of variable volume that is full of liquid, orifice means connecting said third chamber with said second mentioned chamber, and valve means controlling communication between said third chamber and said first mentioned chamber, said valve means closing on extending movement of said telescoping members.

6. A shock absorber according to claim 4, said means on one telescoping member engageable with means on said valve member comprising a compression spring, and said means for moving said valve member to its normally open position comprising a compression spring, said first mentioned spring being stronger then said second mentioned spring.

7. A shock absorber particularly adaptable to use in the landing gear of aircraft comprising telescoping members, diaphragm means fixed in one of said telescoping members and dividing the space enclosed by said members into a chamber above said diaphragm means which contains liquid and air under pressure and a chamber below said diaphragm means which is filled with liquid, said diaphragm means having a tubular central section and the other telescoping member having a rod movable through said tubular section and cooperating therewith to provide restricted liquid flow between said chambers, said tubular section also having a port for substantially unrestricted liquid flow between said chambers, a sleeve member movable between said rod and tubular section, means carried by said rod and engageable with said sleeve member for moving it downwardly to port closing position when said rod and its associated telescoping member move downwardly to fully extended position, cooperating retaining means carried by said tubular section and sleeve member and movable into engagement when said sleeve member occupies its port closing position to prevent its movement therefrom, said retaining means being movable into such engagement by said associated telescoping member on upward movement thereof from its fully extended position during compression and being released by downward extending movement of said associated telescoping member, and means on one of said telescoping members for moving said sleeve member upwardly to port opening position when so released.

8. A shock absorber according to claim 7, said retaining means comprising a locking member carried by said tubular section which is movable radially into engagement with a cooperating recess in said sleeve member.

9. A shock absorber according to claim 8, including an actuating device having frictional sliding engagement with said associated telescoping member and an inclined surface for moving said locking member radially.

10. A shock absorber according to claim 7, said means for moving said sleeve member upwardly to port closing position comprising a spring interposed between said sleeve member and said diaphragm means.

11. A shock absorber according to claim 10, comprising a second spring interposed between said rod and sleeve member for moving the latter downwardly to port closing position, said second mentioned spring being stronger than the first mentioned spring.

MAURICE KATZ.

REFERENCES CITED

The following references are of record in the file of this patent:

UNITED STATES PATENTS

| Number | Name | Date |
|---|---|---|
| 2,098,398 | Mercier | Nov. 9, 1937 |
| 2,186,011 | DePort | Jan. 9, 1940 |
| 2,224,306 | Krueger | Dec. 10, 1940 |
| 2,241,068 | Johnson | May 6, 1941 |
| 2,325,430 | Setz | July 27, 1943 |
| 2,372,137 | Thornhill | Mar. 20, 1945 |